Figure 1:
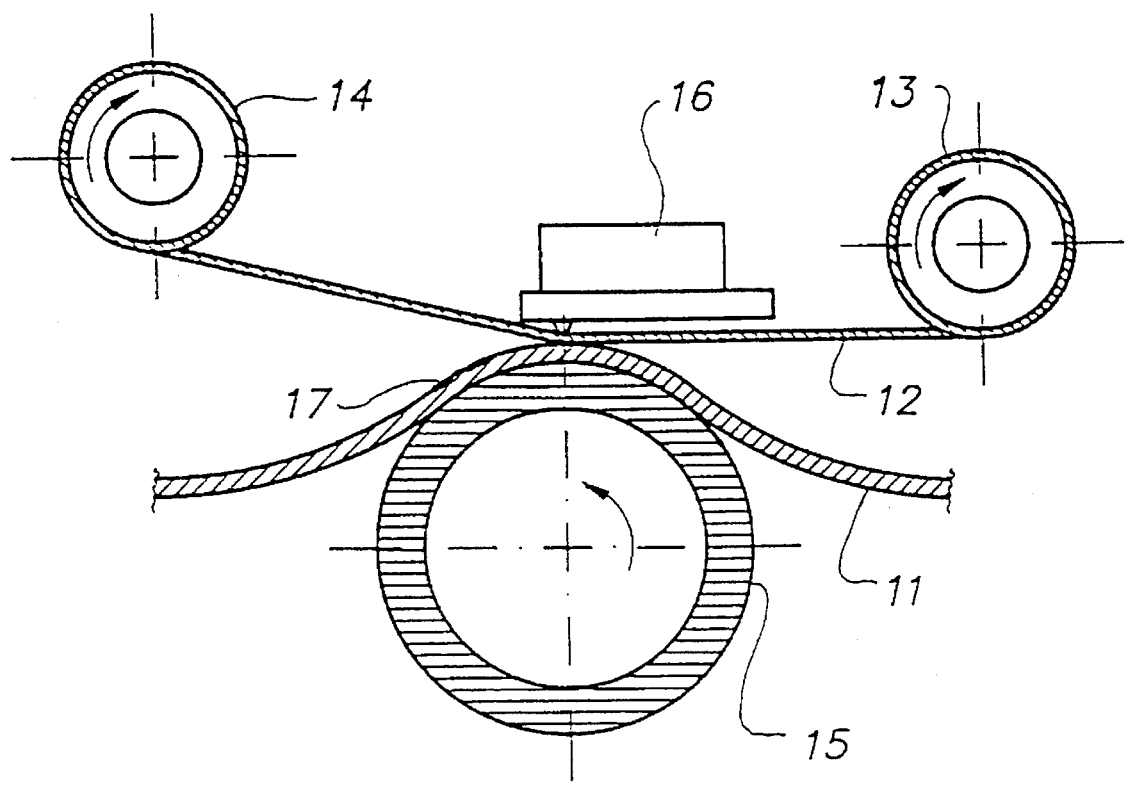

United States Patent [19]
Feytens et al.

[11] Patent Number: 5,453,766
[45] Date of Patent: Sep. 26, 1995

[54] METHOD FOR IMPLEMENTING SPECIFIC TRANSFER CURVES IN THERMAL SUBLIMATION PRINTERS

[76] Inventors: Frans C. Feytens; Marc A. De Clerck; Dirk L. Meeussen; Christian De Hous; Johan M. Braet, all c/o Agfa-Gevaert N.V., DIE 3800, Septestraat 27, B-2640 Mortsel, Belgium

[21] Appl. No.: 945,550

[22] Filed: Sep. 16, 1992

[30] Foreign Application Priority Data

Sep. 27, 1991 [EP] European Pat. Off. .............. 91202511
Jul. 2, 1992 [EP] European Pat. Off. .............. 92201995

[51] Int. Cl.⁶ ................................ B41J 2/32; B41J 2/325
[52] U.S. Cl. ............................ 347/224; 358/298
[58] Field of Search .................. 346/1.1, 76 PH; 400/120; 358/298

[56] References Cited

U.S. PATENT DOCUMENTS

| | | | |
|---|---|---|---|
| 4,532,523 | 7/1985 | Tanaka | 346/76 PH |
| 4,652,892 | 3/1987 | Tanaka | 346/76 PH |
| 5,051,755 | 9/1991 | Takahashi et al. | 346/76 PH |

Primary Examiner—Huan H. Tran
Attorney, Agent, or Firm—Richard J. Birch

[57] ABSTRACT

The invention provides a method of reproducing medical images by a specific thermal sublimation printing process so that optimal image quality for diagnosic perceptibility is obtained through the use of a specific relation between digital signal values and corresponding density values in the hard copy.

10 Claims, 5 Drawing Sheets

METHOD FOR IMPLEMENTING SPECIFIC TRANSFER CURVES IN THERMAL SUBLIMATION PRINTERS

1. Field of the Invention

The present invention is in the field of thermal sublimation printing for the reproduction of medical images. The invention more specifically relates to an image signal processing method for use in said printing system.

2. Background of the Invention

In the field of thermal sublimation printing for the reproduction of medical images it is nowadays common practice to acquire first a representation of the image in an electrical form, whether as a digital or as an analog signal, and to use this electrical representation to obtain the hard copy recording of the image.

This electrical representation can be acquired through computation as for example in computerised tomography, digital fluorography, ultrasound detection, nuclear magnetic resonance etc. Alternatively it can be acquired through the use of an intermediary storage device such as a photostimulable phosphor screen. In this case an object to be examined is irradiated by x-rays and the transmitted x-rays generate an image on the phospor screen. Next, the phosphor screen is stimulated by scanning it with laser light of suitable wavelength and the stimulated emission is detected and converted into an electrical signal.

The hard copy recording-system of the image referred to in this application is a thermal printing process, allowing to print a continuous tone black-and-white or colour image, mostly called "Thermo Sublimation Transfer" (abbreviated as TSP) or "Dye Diffusion Thermal Transfer" (abbreviated as D2T2). Herein a dye-donor element provided with a dye layer containing sublimable dyes having heat transferability is brought into contact with a receiver sheet and selectively, in accordance with a pattern information signal, heated with a thermal printing head provided with a plurality of juxtaposed heat-generating resistors, whereby dye from the selectively heated regions of the dye-donor element is transferred to the receiver sheet and forms a pattern thereon, the shape and density of which is in accordance with the pattern and the intensity of heat applied to the dye-donor element.

In a TSP print process, the native transfer curve, which relates to the hard-copy output densities in function of the digital input data levels, has principally a non-linear shape, sometimes referred to as a sigmoidal or a "S-curve". This includes that if the level of the input data to be printed is set to be proportional to the corresponding energising period as in the prior art, the actual density on the hard copy is not linearly proportional to that of the electronic input data. Therefore, in U.S. Pat. No. 5,051,755 a correction circuit is described such that the actual densities of the printed characters or figures become substantially linearly proportional to the input printing data. Said correction circuit includes a read-only-memory (often abbreviated as ROM) storing a table which represents the preferable relation between the input printing data and the output printing data.

Figure 3:
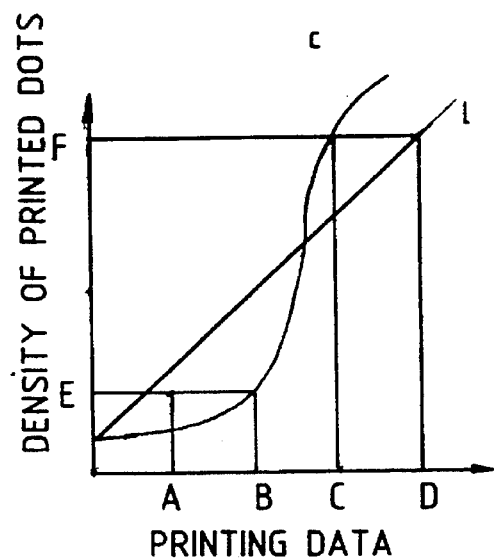

FIG. 3 is a graph for illustrating such a linearly-converting operation. The abscissa and the ordinate of this graph represent the printing data and the actual densities of the printed characters, respectively. In this graph, a line 1 indicates a case in which the printing data are substantially linearly proportional to the actual densities of the printed characters or figures. Here, it is now assumed that a preferable density of the printed character corresponding to the input data A is E. Practically, the data required to obtain the actual density E of the printed character is B. Further, if the input data is D, a preferable density of the printed character is F. Practically, it is C that is required to obtain the actual density F of the printed character. Thus, the correction circuit converts input data D into data C as the printing data and outputs this printing data. After iteration of the same reasoning to all densities of the transfer curve, one may finally conclude that the (linear) transfer curve 1 is obtained by actual outputting converted energies relating to curve c.

However, experience shows that when a film radiograph has been quantised uniformly (or "linearly") in optical density, the diagnostic perceptibility, especially in the low-to-mid-density regions, is not maximal.

Medical diagnosis executed by the radiologist is based upon the visual inspection of a radiographic image recorded on a transparant film, and the accuracy of said medical diagnosis is generally recognised as depending primarily on the skill and the experience of the radiologist and on the technical characteristics of the radiographic system.

3. Summary of the Invention

It therefore is an object of the present invention to provide a method of thermal sublimation printing for reproducing a medical image represented by a digital image signal so that optimal diagnostic perceptibility is obtained.

Further objects will become apparent from the following description and the appended claims with reference to the accompanying drawings.

We now have found that the above-mentioned objects can be achieved by providing a thermal sublimation printing method of making a continuous-tone black-and-white or colour hard-copy of an electrical image on transparent film for inspection on a light-box, comprising the step of subjecting the image signals to a typical processing causing the processed signal values to be mapped onto corresponding density values, characterised in that said processing includes a non-uniform quantisation which allocates a small gradient to the transfer curve in the low density region, a higher gradient to the transfer curve in the intermediate density region, and a still higher gradient to the transfer curve in the highest density region, such that the resulting densities on the hard-copy are spaced at equal perceived lightness with minimal perceptible contrast.

So, optimal-diagnostic visual perception of the resulting hard-copy on said light-box is obtained, meaning that the density difference in between successive density levels is the minimal density difference or contrast that can be perceived by the human eye.

4. Detailed Description of the Invention

Figure 2:
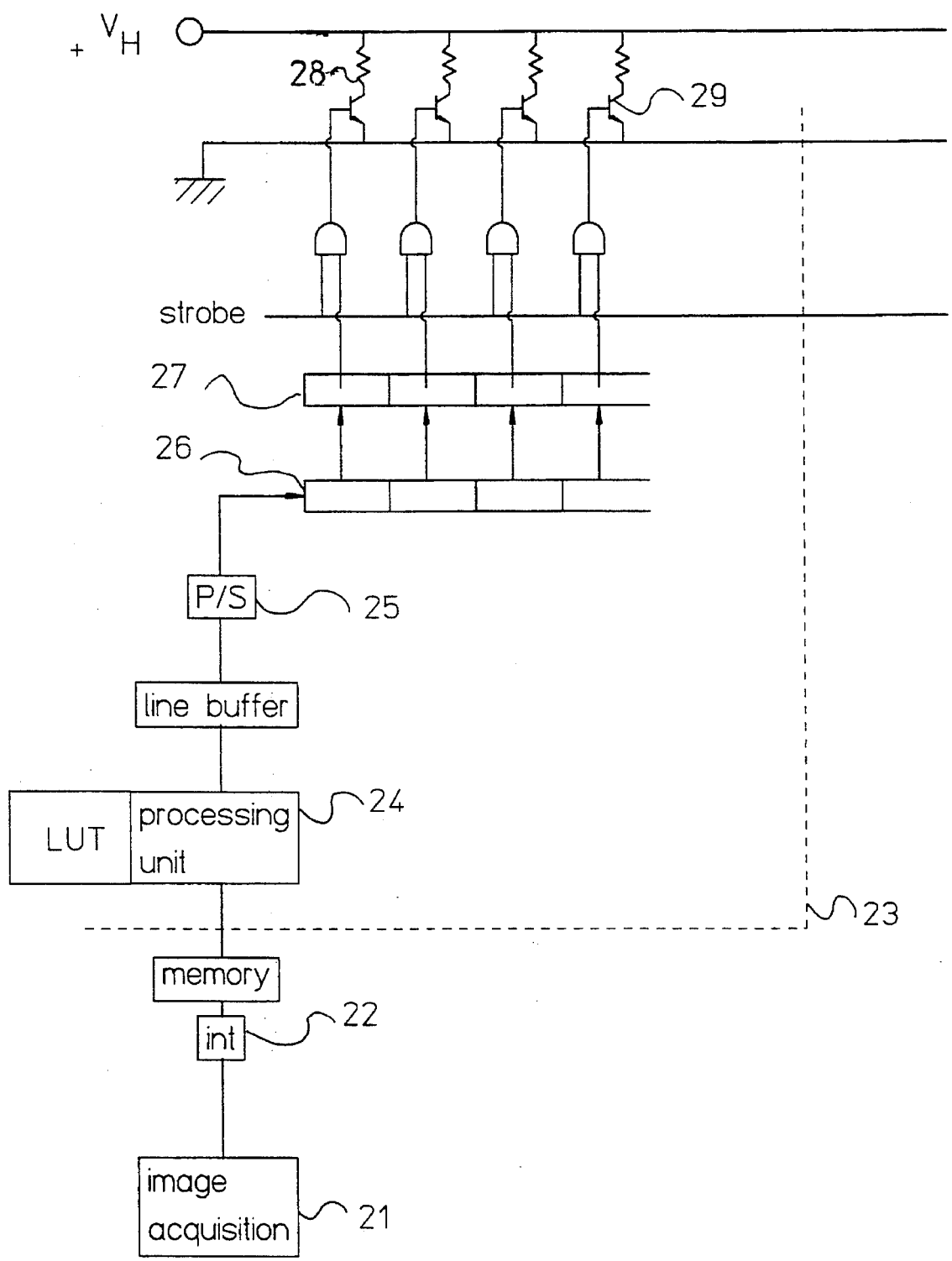
Figure 4:
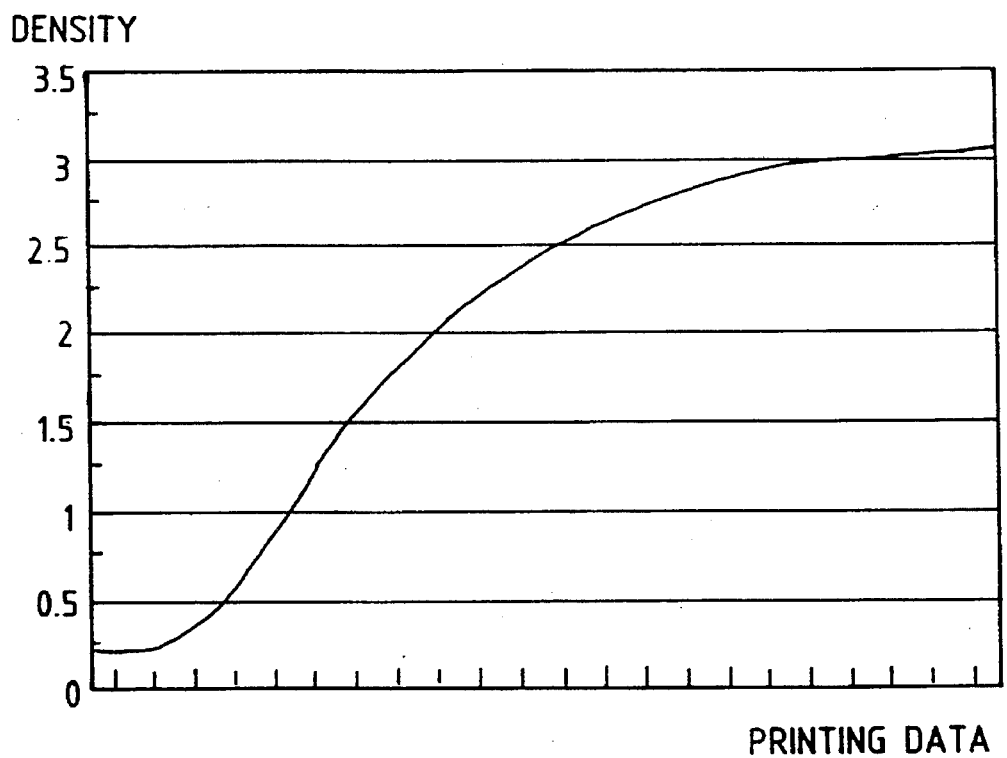
Figure 5:
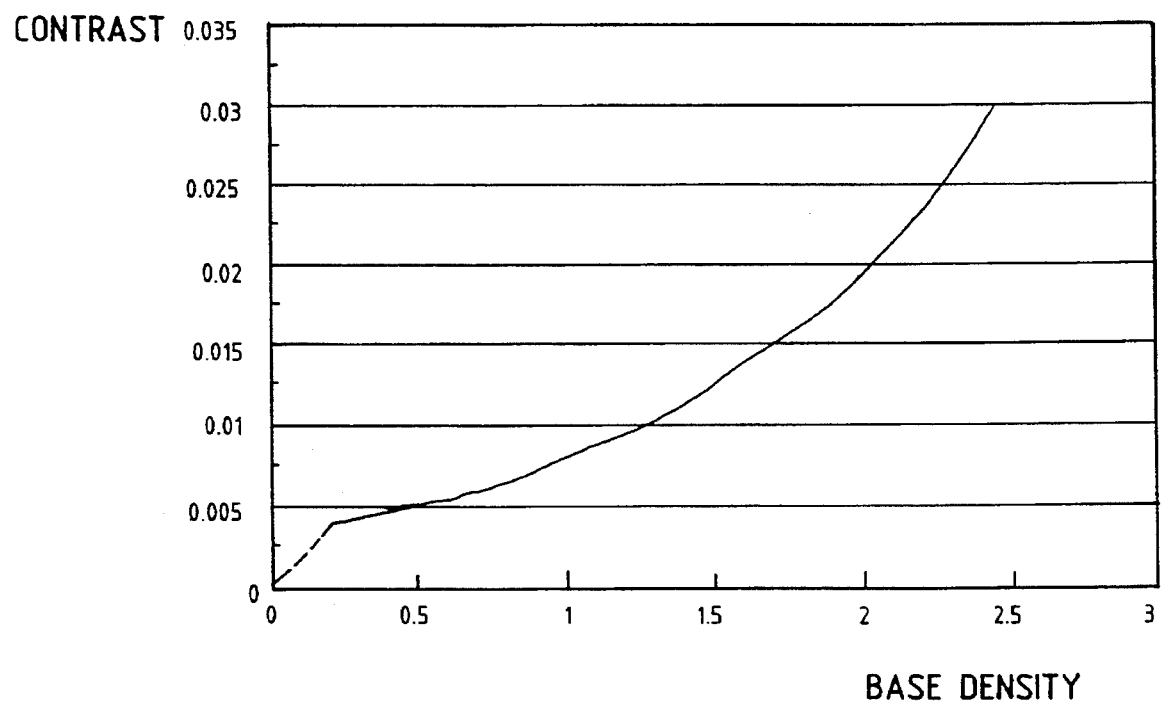
Figure 6:
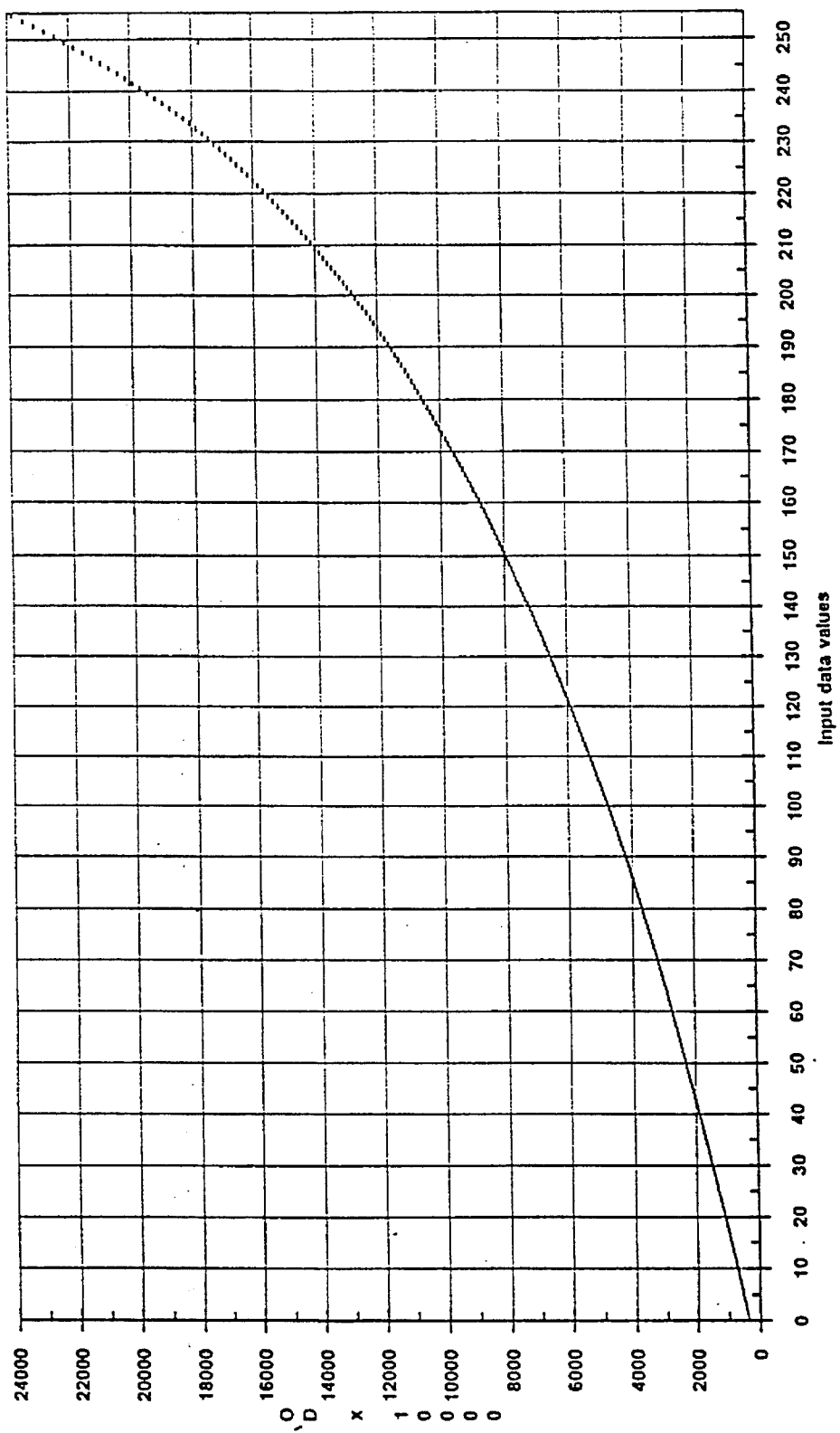

Hereinbelow the present invention will be clarified in detail with reference to the attached drawings, in which FIG. 1 is a principe-scheme of a thermal sublimation printer, FIG. 2 is a data-flow-diagram of a thermal sublimation process, FIG. 3 is a graph showing a linearised transfer-curve, FIG. 4 is an actual native transfer-curve, FIG. 5 is a perceptibility curve showing the relationship of minimum perceptible contrast to base density, FIG. 6 is a practical optimised transfer curve according to the present invention, table 1 is a practical optimised transfer table according to the present invention.

Referring to FIG. 1, there is shown a global principe-scheme of a thermal printing apparatus which is capable to print a line of pixels at a time on a receiver (or acceptor) member (11) from dyes transferred from a carrier (or dye-donor) member (12). The receiver (11) is in the form of a sheet; the carrier (12) is in the form of a web and is driven from a supply roller (13) onto a take-up roller (14). The receiver (11) is secured to a rotatable drum or platen (15), driven by a drive mechanism (not shown) which continuously advances the drum (15) and the receiver sheet (11) past a stationary thermal head (16). This head (16) presses the carrier (12) against the receiver (11) and receives the output of the driver circuits. The thermal head (16) normally includes a plurality of heating elements equal in number to the number of pixels in the data present in a line memory. The image-wise heating of the dye donor element is performed on a line-by-line basis, with the heating resistors geometrically juxtaposed each along another and with gradual construction of the output density. Each of these resistors is capable of being energised by heating pulses, the energy of which is controlled in accordance with the required density of the corresponding picture element. As the image input data are denser, the warming time increases, thereby augmenting the output energy and so the optical density of the hard-copy image (17) on the receiving sheet. On the contrary, lower density image data cause the heating time to be shortened, giving a lighter picture (17).

The different processing steps are illustrated in the diagram of FIG. 2. First a digital signal representation is obtained in an image acquisition apparatus (21). Then, the image signal is applied via a digital interface (22) and a first storing means (indicated as "memory" in FIG. 2) to a recording unit (23), namely a thermal sublimation printer. In the recording unit (23) the digital image signal is processed (24) according to the method of the present invention. Next the recording head (16) is controlled so as to produce in each pixel the density values corresponding with the processed digital image signal value (24). Finally the hard copy (17) is produced, which might be explained in some further detail, still referring to the same FIG. 2. After processing (24) and parallel to serial conversion (25) of the digital image signals, a stream of serial data of bits is shifted into a second storing means, e.g. a shift register (26), representing the next line of data that is to be printed. Thereafter, under controlled conditions, these bits are supplied in parallel to the associated inputs of a latch register (27). Once the bits of data from the shift register (26) are stored in the latch register (27), another line of bits can be sequentially clocked into shift register (26). As to the heating elements (28), the upper terminals are connected to a positive voltage source, while the lower terminals of the elements are respectively connected to the collectors of the driver transistors (29), whose emitters are grounded. These transistors (29) are selectively turned on by a high state signal applied to their bases and allow current to flow through their associated elements (28). In this way a thermal sublimation hard-copy (17 in FIG. 1) of the electrical image data is recorded.

Said digital image data for reproduction in medical applications are mostly available as 8 bit pixel values, which are in proportion to the densities of the corresponding pixels in the original image. For a good understanding of said proportion, remember that a digital image is a two-dimensional array of quantised density values or pixels $I(m,n)$ where m represents the pixel column location and n represents the pixel row location. For an M×N image matrix or array, m can take on values $1, 2, \ldots M$; n can take on values $1, 2 \ldots N$. For example, an image with a $512^2$ matrix will have 512 columns and 512 rows, thus 512 pixels horizontally in the x direction and 512 pixels vertically in the y direction. The number of density values of each pixel to be reproduced is restricted by the number of bits per pixel. For a K-bit deep-image matrix, individual pixels can have $2^K$ density values, ranging from 0 to $2^K-1$. If the matrix or pixel depth is 12 bits, the image can have up to $2^{12}$ or 4096 density values; likewise an 8-bit image has $2^8$ or 256 density values.

When putting said digital image data (21) to be reproduced by a thermal sublimation printer without any data-conversion, we obtain the so-called "native" transfer curve of the TSP print process, relating the optical density in function of the input data levels, and having the shape of a sigmoidal or "S-curve", as illustrated by FIG. 4 for an actual native curve. With the aid of this figure, it is immediately clear that the recorded density on the receptor medium has a non-linear relation against the input energy and thus that the slope-coefficient or gradient of the curve is not a constant and that in the high density region saturation is induced. The diagnostic perceptibility obtained by using such a native transfer curve is extremely unsatisfactory.

From the human point of view, when visual inspecting the resulting film on a light-box, the amount of discernible grey levels is rapidly reduced from about 300 in best conditions-i.e. good homogeneous light box, not too many white parts in the image itself, no ambient light which may be reflected from the film's surface to much less levels with some background illumination being present. In order to get the most information out of the recorded radiograph, as well the form of the transfer curve as the number of density-levels are of the highest importance.

In optimising the reproduction of the transfer curves, Agfa has greatly made use of scientific visualization studies available in the relevant literature, as publicated by Conners, Kanamori, Sherrier, Szezan and many others, as well as made use of further developments attained from company-own studies and experiments.

In general, we sustain the principle of equal perceived lightness as described in Acta Radiologica Diagnostica, Vol. 4,463 (1966), by H. Kanamori and meaning that wherever you put a certain contrast on the transfer curve it has to be equally perceptable on the resulting film when inspected on a light-box. Per consequence, the risk of hiding a contrast, perhaps important to pathology, is practically avoided.

In order to clarify the concept of the relevant minimum perceptible contrast, we refer to the actual perceptibility curve of FIG. 5, showing the relationship of minimum perceptible contrast to base density (for a fixed brightness of the lightbox) as embodied in one of the preferred embodiments.

With the purpose to attain said perceptibility, we incorporate a technical feedforward system by means of a specific relation between digital signal values and corresponding density values envisioned in the reproduction. This specific relation (which will be explained further) provides optimal contrast performance matched to the detectability of the eye and irrespective of the position on the digital signal value axis.

Concerning said relation, a preferred embodiment of the present invention now will be explained in reference to FIG. 6, in which one particular transfer curve rendering an optimal perceptibility is shown. The very specific transfer curve for determining the density levels in correspondence with the digital signal levels as illustrated in FIG. 6 provides the maximum of available density levels because the density difference in between successive density levels is the minimal density difference that can be perceived by the human eye.

Before explaining further embodiments of the present invention for the technological realisation of said optimal transfer curves, let's make it clear that for better displaying the diagnostically important information, we intentionally manipulate the density-values according to the above-mentioned transfer curve. Hereto, the digital signals obtained by the image acquisition system (ref 21 in FIG. 2) are applied to a thermal head (ref 16 in FIG. 1), after being processed (ref 24), so that a density varying pattern (17) representing the medical image is obtained on a recording material (11). For this purpose a relation has to be defined between digital signal values and corresponding densities into which they will be converted in the hard copy.

As a result of the progress of technology attained by intensive developments within our company, we have found an optimal transfer curve which is described in the next paragraph. Although a broad range of curves can be generated, it is preferred that those curves are selected that, given a fixed $D_{min}$ and a fixed $D_{max}$, have an intrinsic addressability of about 256 levels (or more as e.g. 512 levels) so as to be matched to the output performance of the reproducing device.

In a preferred embodiment of the present invention, we apply a thermal sublimation printing method for an electrical image being represented by a K-bit digital signal for inspection on a light-box comprising the steps of -determining $2^K$ density values to correspond with $2^K$ digital signal values by mapping the minimum and the maximum signal value respectively onto the minimum and the maximum density value envisioned in the hard-copy and by calculating intermediate density values as $D_{i+1}=D_i+$Delta $D_i$ wherein $$\text{Delta } D_i = \log \left\{ 1 - \frac{(0,0123) \times [0,808 + (lum_i + alfa)^{1/2}]^2}{lum_i} \right\}$$

$D_i$ being an intermediate density value between $D_{min}$ and $D_{max}$, alfa being an integer value between 0 and 1040, $lum_i=(lumscale)\times(\pi)\times(10^{-D_i})$ being the specific illuminance level caused by $D_i$ expressed in cd/m$^2$ and lumscale being the luminance of said light-box, and by interpolating between the calculated density values, -mapping successive intermediate signal values onto the determined successive density values, -converting the signal values into corresponding density values in the hard copy.

In another preferred embodiment of the present invention, we apply a thermal sublimation printing method for an electrical image being represented by a K-bit digital signal, comprising the steps of -determining $2^K$ density values to correspond with $2^K$ digital signal values by mapping the minimum and the maximum signal value respectively onto the minimum and the maximum density value envisioned in the hard-copy and by calculating intermediate density values in a simplified but adequate way as $$D_{i+1}=D_i+\text{Delta } D_i$$

wherein $$\text{Delta } D_i = -\ln[1-(c)\times(e^{D_i})]$$

$D_i$ being an intermediate density value between $D_{min}$ and $D_{max}$, c being a constant defined by the restrictions that $D_0=D_{min}$ and that $D_{L-1}=D_{max}$ L representing the number of data-levels, -mapping successive intermediate signal values onto the determined successive density values, -converting the signal values into corresponding density values in the hard copy.

Contrary to the foregoing embodiments which derive the transfer curve by a calculation procedure, said relation may also be implemented in the form of a look up table, as it is in a next embodiment of the present invention. Herein each pixel value in the input image of the acquisition apparatus (ref 21 in FIG. 2) is mapped into the output image in such a way that each output pixel's value depends only on the value of the corresponding input pixel. In other words, instead of sending the pixel data directly to the thermal head (ref 16 in FIG. 1), each pixel will first be replaced by its corresponding LUT-value (ref 24). E.g. code 0 (00000000) gives the measured fog level; code 255 (11111111) the choosen $D_{max}$; all other values follow said optimal transfer curve in between them. After processing the electrical image signals with the aid of said transformation table LUT, according to the present invention, even the darker shades are easily distinguished.

As to one of our embodiments, said LUT defines the printer so that a pixel value of zero corresponds with the minimum desired density value (e.g. in the range of 0 to 0.5 D) and the maximum pixel value (i.e. 255) corresponds with the maximum desired density (e.g. in the range from 2.0 to 3.5 D), while all the pixel values in between correspond to the specified transfer curve. The invention will be further described by way of a non-limititative example in table 1. In this table I one particular transformation LUT rendering an optimal perceptibility is shown, containing the enumeration of the $L=2^K= 256$ density levels onto which successive digital values are mapped. The minimum signal value corresponds with the minimum density value envisioned in the reproduction and the maximum signal value corresponds with the maximum density value envisioned in the reproduction. In our experience, evaluation may now be performed in an accurate, reproducible manner by simple visual inspection.

The use of a specific LUT-embodiment still brings also an additional advantage. While such a table consists of an ordered pair of input and output pixel values, incorporating the functional relationship of the specific transfer curve, the LUT is very efficient in performing repetitive operations. Indeed, rather than calculating the output pixel value from the input pixel value, the output value is directly retrieved from memory. Especially when dealing with large size images, this can save a significant amount of time.

The present invention clearly can also be applied in the case of coloured images, in the case of which the electrical signals corresponding to the different colour selections are sequentially subjected to typical corresponding transformation look-up tables such that the diagnostic visual perception of the coloured hard-copy reaches an optimum.

The present invention may be modified to give the radiologist an opportunity to fit the transfer-curve conform to his personal user-taste such that the ultimate hard-copy image of said TSP process is depicted by density values which perform the specific user-taste, meaning that the density difference in between successive density levels is the density difference conform to the personal user-taste of the diagnosting radiologist.

The printing is not limited to the above-explained method employing a thermal head, but can also be applied in other technologies, such as resistive ribbon printing or laser printing.

TABLE 1 transfer table according to the present invention

Dmin = 0.0366  Dmax = 2.4287

Optical density (OD) × 10000

| | | | | | | | |
|---|---|---|---|---|---|---|---|
| 336 | 402 | 438 | 474 | 510 | 546 | 582 | 618 |
| 655 | 692 | 729 | 766 | 803 | 840 | 877 | 914 |
| 952 | 990 | 1028 | 1066 | 1104 | 1142 | 1180 | 1219 |
| 1258 | 1297 | 1336 | 1375 | 1414 | 1454 | 1494 | 1534 |
| 1574 | 1614 | 1654 | 1695 | 1736 | 1777 | 1818 | 1859 |
| 1900 | 1942 | 1984 | 2026 | 2068 | 2110 | 2152 | 2195 |
| 2238 | 2281 | 2324 | 2367 | 2410 | 2454 | 2498 | 2542 |
| 2586 | 2630 | 2675 | 2720 | 2765 | 2810 | 2855 | 2901 |
| 2947 | 2993 | 3039 | 3086 | 3133 | 3180 | 3227 | 3274 |
| 3322 | 3370 | 3418 | 3466 | 3515 | 3564 | 3613 | 3662 |
| 3712 | 3762 | 3812 | 3862 | 3912 | 3963 | 4014 | 4065 |
| 4116 | 4168 | 4220 | 4272 | 4325 | 4378 | 4431 | 4484 |
| 4538 | 4592 | 4646 | 4701 | 4756 | 4811 | 4866 | 4922 |
| 4978 | 5034 | 5091 | 5148 | 5202 | 5263 | 5321 | 5379 |
| 5438 | 5497 | 5556 | 5616 | 5676 | 5737 | 5798 | 5859 |
| 5921 | 5983 | 6045 | 6108 | 6171 | 6235 | 6299 | 6363 |
| 6428 | 6493 | 6559 | 6625 | 6692 | 6759 | 6826 | 6894 |
| 6962 | 7031 | 7100 | 7170 | 7240 | 7312 | 7384 | 7457 |
| 7530 | 7604 | 7678 | 7753 | 7828 | 7904 | 7981 | 8058 |
| 8136 | 8214 | 8293 | 8373 | 8453 | 8534 | 8615 | 8697 |
| 8780 | 8864 | 8948 | 9033 | 9119 | 9205 | 9292 | 9380 |
| 9469 | 9558 | 9648 | 9739 | 9831 | 9924 | 10018 | 10112 |
| 10207 | 10303 | 10400 | 10498 | 10597 | 10697 | 10798 | 10900 |
| 11003 | 11107 | 11212 | 11318 | 11425 | 11534 | 11644 | 11755 |
| 11867 | 11980 | 12095 | 12211 | 12328 | 12447 | 12567 | 12689 |
| 12812 | 12936 | 13062 | 13190 | 13319 | 13450 | 13583 | 13717 |
| 13853 | 13991 | 14131 | 14273 | 14417 | 14563 | 14711 | 14861 |
| 15014 | 15169 | 15326 | 15487 | 15650 | 15816 | 15985 | 16157 |
| 16332 | 16510 | 16691 | 16875 | 17063 | 17254 | 17448 | 17646 |
| 17848 | 18054 | 18265 | 18481 | 18702 | 18928 | 19159 | 19395 |
| 19636 | 19884 | 20137 | 20398 | 20666 | 20941 | 21223 | 21513 |
| 21813 | 22122 | 22440 | 22768 | 23108 | 23460 | 23825 | 24287 |

We claim:

1. A thermal sublimation printing method for making a continuous-tone hard-copy on transparent film for inspection on a light-box of an electrical image represented by a plurality of image signals, said method comprising the steps of supplying the plurality of image signals to a processing unit of a thermal printer;

processing the plurality of image signals to produce processed signal values that are mapped onto a corresponding plurality of film density values;

providing the processed signal values to a thermal head having a plurality of heating devices for selectively heating said devices;

printing the electrical image by selectively heating of a dye-donor element through said plurality of heating devices so as to transfer dye pattern-wise to a receiver sheet being a transparent film;

wherein said processing of the plurality of image signals comprises a non-uniform quantization that allocates a small gradient to a transfer curve in a low density region, a higher gradient to the transfer curve in an intermediate density region, and a still higher gradient to the transfer curve in a still higher density region, such that densities on the hard-copy are spaced at equal perceived lightness with minimal perceptible contrast.

2. A thermal sublimation printing method according to claim 1 wherein the hard-copy on the transparent film has optical densities in the range of 0 and 3.5 D.

3. A thermal sublimation printing method according to claim 1 wherein the hard-copy on the transparent film has at least 256 optical densities.

4. A thermal sublimation printing method according to claim 1, wherein the continuous-tone hard-copy of the electrical image on transparent film is a continuous-tone black-and-white hard-copy on a transparent film.

5. A thermal sublimation printing method according to claim 1, wherein the electrical image is a radiographic image obtained by scanning a stimulable phosphor sheet carrying a radiation image with stimulating rays, detecting light emitted after stimulation and converting the detected light into electrical image signals.

6. A thermal sublimation printing method for making a continuous-tone hard-copy on transparent film for inspection on a light box of an electrical image represented by a K-bit digital signal, said method comprising the steps of: determining $2^K$ density values to correspond with $2^K$ digital signal values by mapping minimum and maximum digital signal values onto corresponding minimum and maximum density values envisioned in the hard-copy and by calculating intermediate density values as $D_{i+1}=D_i+\text{Delta } D_i$ wherein $$\text{Delta } D_i = \log \left\{ 1 - \frac{(0,0123) \times [0,808 + (lum_i + alfa)^{1/2}]^2}{lum_i} \right\}$$

$D_i$ being an intermediate density value between $D_{min}$ and $D_{max}$, alfa being an integer value between 0 and 1040, $lum_i=(\text{lumscale})\times(\ )\times 10^{-D_i})$ being a specific illuminance level caused by $D_i$ expressed in cd/m$^2$ and wherein said light box has a luminance with lumscale being the luminance of said light box, and by interpolating between the calculated density values, mapping successive intermediate signal values onto the successive calculated density values, converting the signal values into corresponding density values in the hard copy.

7. A thermal sublimation printing method according to claim 6 wherein said processing is implemented by a look-up transformation table, containing an enumeration of density values onto which digital signal values are mapped.

8. A thermal sublimation printing method for making a continuous-tone hard-copy on transparent film for inspection on a light box of an electrical image being represented by a K-bit digital signal, comprising the steps of:

determining $2^K$ density values to correspond with $2^K$ digital signal values by mapping minimum and maximum digital signal values onto corresponding minimum and maximum density value envisioned in the hard-copy and by calculating intermediate density values as $$D_{i+1} = D_i + \text{Delta } D_i$$

wherein $$\text{Delta } D_i = -\ln[1-(c)\times(e^{D_i})]$$

$D_i$ being an intermediate density value between $D_{min}$ and $D_{max}$, c being a constant defined by the restrictions that $D_O = D_{min}$ and that $D_{L-1} = D_{max}$ L representing a number of data-levels, mapping successive intermediate signal values onto the successive calculated density values, converting the signal values into corresponding density values in the hard copy.

9. A thermal sublimation printing method according to claim 8 wherein said processing is implemented by a look-up transformation table, containing an enumeration of density values onto which digital signal values are mapped.

10. A thermal sublimation printer for recording an electrical image on a continuous-tone film, comprising a printing head having a plurality of heating devices for printing an image; first storing means for storing input electrical image signals; transformation means for transforming the input electrical image signals into output signals for said plurality of heating devices; second storing means for storing said output signals for said plurality of heating devices; controlling means for driving said plurality of heating devices according to the stored output signals; characterized in that said transformation means appropriately selects increments of sublimation energy for driving the plurality of heating devices so that the increment of the energy corresponding to the change of one level of the density in the lower density regions is smaller than the increment of the energy corresponding to the change of one level of the density in the higher density regions whereby densities on the continuous-tone film are spaced at equal perceived lightness with minimal perceptible contrast.

* * * * *